March 23, 1937.  O. M. BOUNDS  2,074,360
BRAKE FOR AIRPLANES
Original Filed Aug. 25, 1930  3 Sheets-Sheet 1
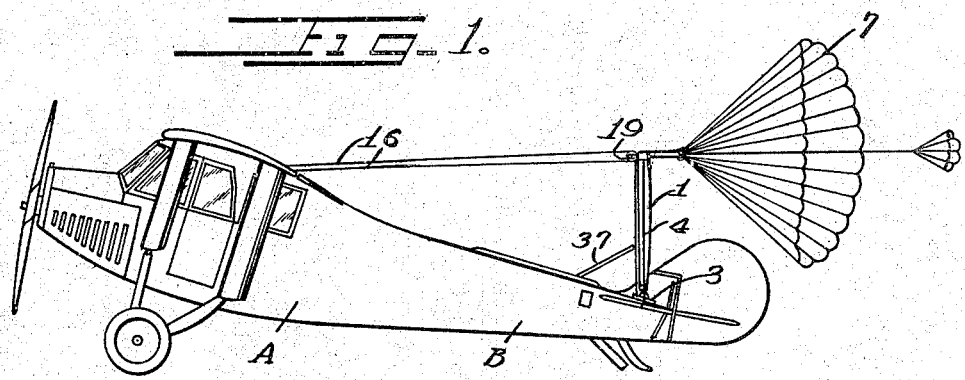
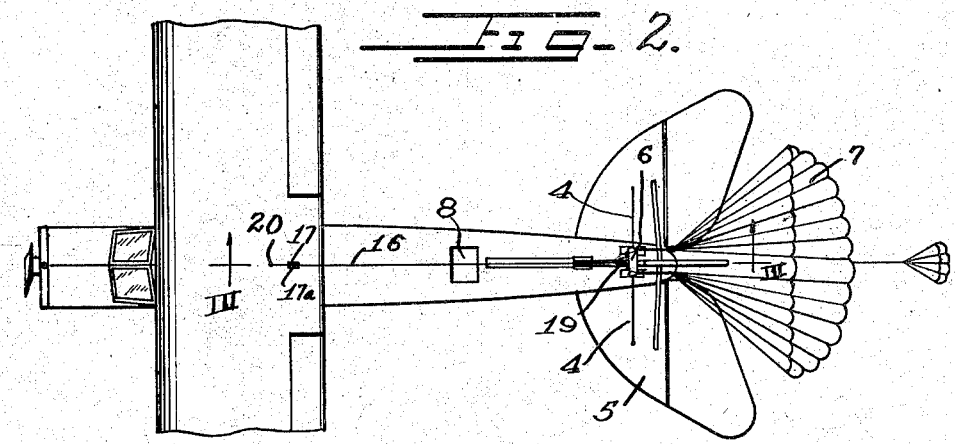
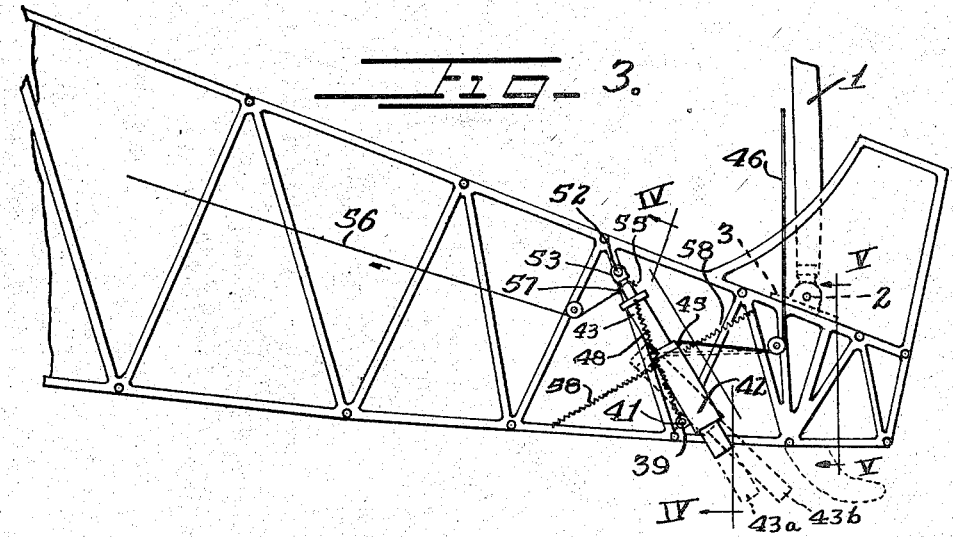
Inventor
Overton M. Bounds.
by Charles O. Will Attys.

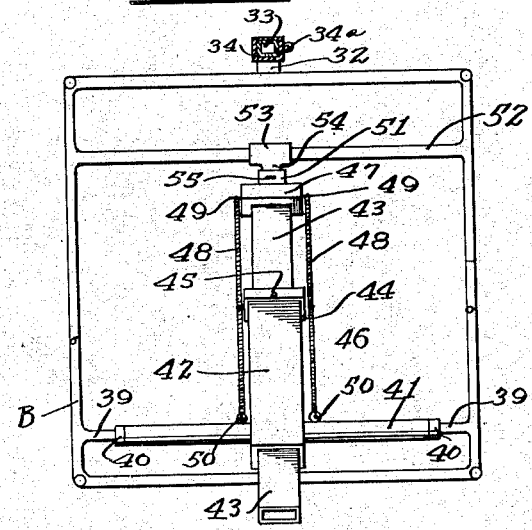
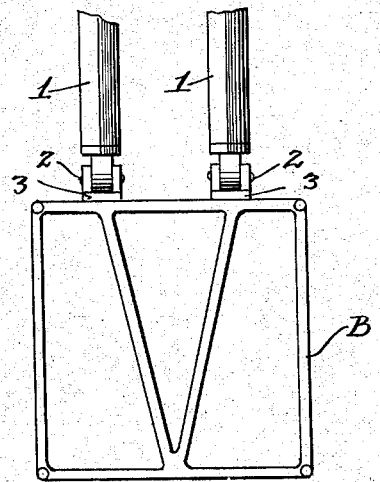
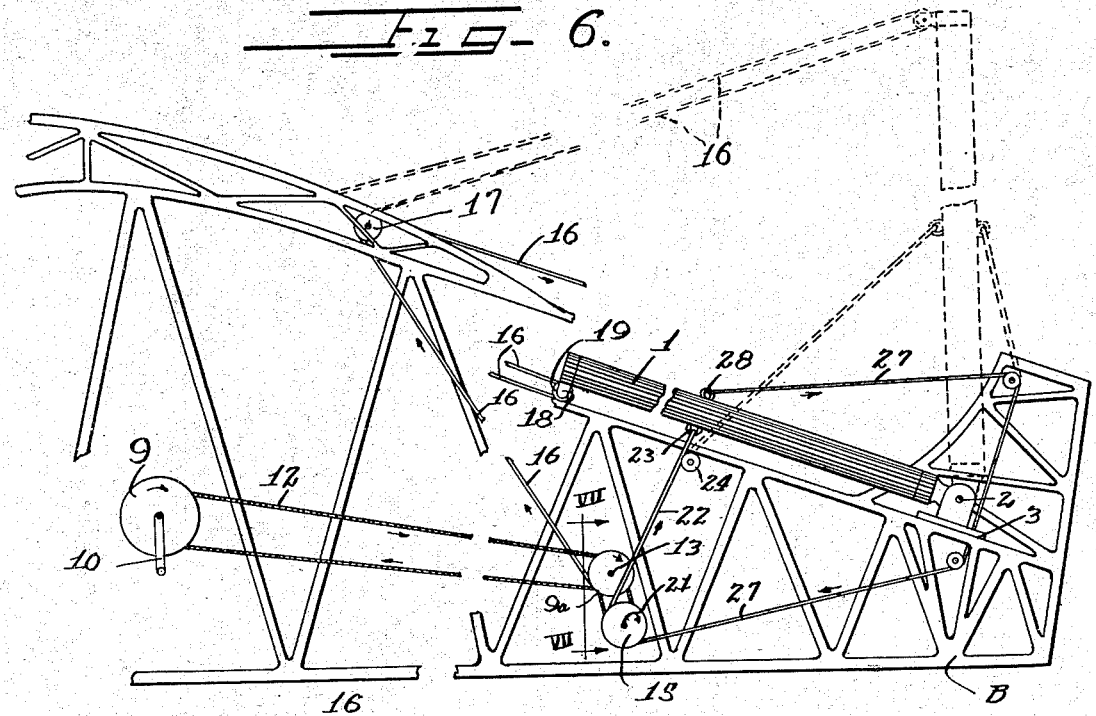

March 23, 1937.  O. M. BOUNDS  2,074,360
BRAKE FOR AIRPLANES
Original Filed Aug. 25, 1930   3 Sheets—Sheet 3
Fig. 8.
Fig. 10.
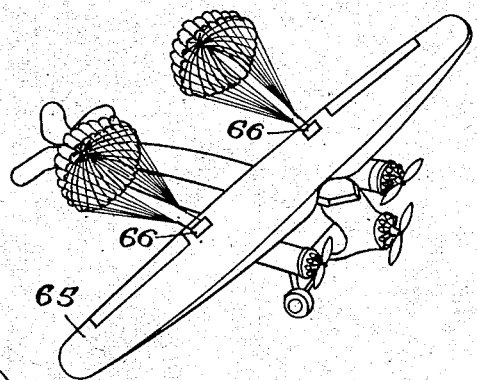
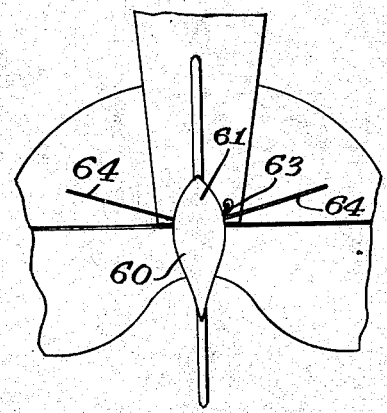
Fig. 9.
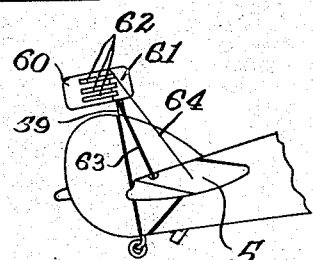
Fig. 11.
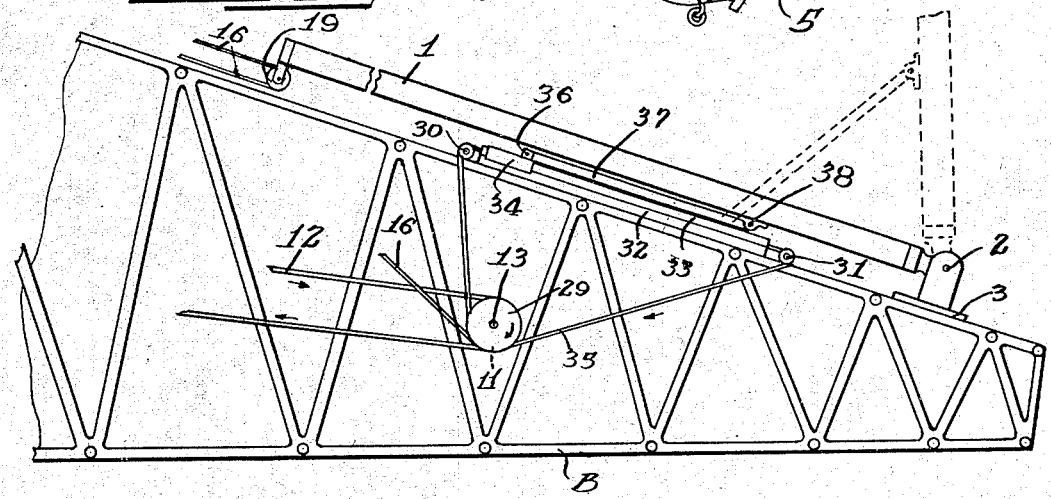
Inventor
Overton M. Bounds.
By Charles W. Villatte Patented Mar. 23, 1937

2,074,360

UNITED STATES PATENT OFFICE 2,074,360

BRAKE FOR AIRPLANES

Overton M. Bounds, Oklahoma City, Okla.

Application August 25, 1930, Serial No. 477,543
Renewed November 27, 1934

9 Claims. (Cl. 244—113)

This invention relates to airplanes and has particularly to do with braking means therefor.

It is the conventional practice nowadays to employ brakes in connection with the chassis wheels of airplanes. While the wheels are as a rule located forwardly of the center of gravity of the airplane, to keep the plane from nosing over when it is running on the ground, it is nevertheless a very common occurrence for nosing over to take place, when the brakes are applied with exceptional force. Of course, while a landing may be made in an airport or other place in which plenty of space is provided in which to bring the airplane to rest, without necessitating the abnormal application of the brakes, it happens quite often, as in the case of a forced landing, that the area afforded for landing is so small or contains such obstructions, that the need for stopping in a very small space is very urgent. It will be appreciated, then, that in order to bring the airplane to a rest very quickly, in order to avoid projections or obstructions or the like, extraordinary force must be applied to the brakes. Such application of the brakes causes, in a large number of cases, the front part of the airplane to engage and become imbedded in the earth, with resultant injuries to the airplane and its occupants.

It is accordingly a principal object of the invention to provide means for stabilizing the airplane while it is running on the ground. A further object resides in the provision of means for braking the airplane, whether it be of the land or sea type.

More specific objects reside in novel operating instrumentalities for these braking and stabilizing means, and in addition, certain means whereby the braking or stabilizing device is supported selectively in operative and inoperative position.

In carrying out my invention, I employ parachutes adapted for mounting on the airplane in such a position, that the torque occasioned by the wind maintaining the parachute open, is in a direction tending to stabilize the airplane, that is, to keep the front of the airplane from nosing into the ground. The parachute may be operated or opened by the pilot, either directly, in which case the pilot will pull the rip cord, or indirectly, in which case the operator puts into motion certain forces in conjunction with the ground upon which the airplane is moving, resulting in a pull on the rip cord.

With the construction just provided, it will be apparent that the parachute will serve not only to stabilize the plane, but by reason of the additional braking force thus provided, less force need be applied to the brakes, thus making for longer life of the brakes, and eliminating the hazard of nosing over.

The above, other and further objects of the invention will be apparent from the following description, accompanying drawings and appended claims.

This invention (in a preferred form) is illustrated in the drawings and hereinafter more fully described.

On the drawings:

Figure 1 is an elevational view illustrating my invention in operation;

Figure 2 is a fragmentary plan view of the construction shown in Figure 1;

Figure 3 is an enlarged fragmentary view taken substantially in the plane indicated by the lines III—III of Figure 2, showing in particular a means for pulling the rip cord of a parachute;

Figure 4 is a view taken as shown by the broken line IV—IV in Figure 3;

Figure 5 is a fragmentary view taken approximately in the plane indicated by the line V—V of Figure 3;

Figure 6 is a view somewhat similar to Figure 3, but showing a means for actuating and supporting a parachute carrying mast on an airplane;

Figure 7 is a view taken substantially in the plane indicated by the lines VII—VII in Figure 6;

Figure 8 is a perspective view illustrating another form of my invention;

Figure 9 is a fragmentary perspective view showing a still further modification of my invention;

Figure 10 is a plan view in fragmentary form of the construction shown in Figure 9;

Figure 11 is a view similar to Figure 6, but showing another form of mast actuating and supporting means.

Referring now more particularly to the drawings, wherein like parts are designated by the same numerals, I illustrate a conventional airplane at A, having a fuselage B on the rear end of which masts 1 are pivotally mounted at 2 by means of brackets 3. Guy wires 4 are fastened to the tops of the masts and to the stabilizer 5 so as to maintain the masts in proper position. The masts 1 are connected for movement together by a brace bar 6, and the parachute 7 in its closed pack is adapted to be supported by this bar and the masts, between the latter. The parachute may be provided with a pilot as in conventional practice.

Operating mechanism is provided for shifting the masts from inoperative to operative position, and serves also to maintain the masts selectively in each of these positions. To this end, a sheave 9 provided with a crank handle 10 is located in easy reach of the pilot, and is connected for rotation with a rearwardly disposed sheave 9a, by means of a chain 12 and cooperating sprockets. The shaft 13, carried by the fuselage B, passes through the sheave 9a and is connected by chain and sprocket means 14 to a second shaft 15 for rotation therewith. A cable 16, operatively associated with a sheave 11 on the shaft 13, is adapted to cooperate with the roller 17, mounted in the upper part of the fuselage or in the wing in a recess 17a. Eyelets 18, provided in the upper part of the masts 1 are connected by an element indicated at 19, which element, in practice, assumes the form of a pulley. The portion of the cable 16 passing over the roller 17 is hooked about the element 19, and is returned, its end being fixed to the wing or other suitable part of the airplane, as shown at 20.

Mounted on the shaft 15 is a sheave 25, encircled by a cable or the like 22, in cooperation with a roller 24, one end of which cable is connected to the masts 1 at 23.

A cable 27 is wound about a sheave 21 carried by the shaft 15. The cable receiving portion 26 of the sheave 25 constitutes what is in effect a spring motor constantly tending to wind up the cable 22 and take up all slack therein. The cable receiving portion of the sheave 21 is of the usual type rotatable with the shaft 15, and has fixed thereto one end of the cooperating cable 27.

While I have described spring operated instrumentalities whereby to take up slack in the cable 22, it will be appreciated that other forms or constructions may be availed of, such as a roller which may be supported by the slack cable or a sheave having portions of larger or smaller diameters, which, upon rotation in one direction, would pay out sufficient cable to permit the masts to stand upright, and upon turning in the opposite direction would wind up the slack created upon shifting the masts to a position of repose as shown in full lines in Figure 6. It will be noted that the same exigency, namely, that of taking care of the slack, arises in connection with the cable 16. The sheave 11 is accordingly constructed substantially after the manner of the sheave 25, incorporating a spring motor about which the cable 16 is wound. To be sure, the force exerted by the spring will be sufficiently great to offset the wind pressure against the masts 1 when the latter are upright. As a further precaution, ratchet means may be associated with the wheel 9, including a hand operated spring or other type of release, to prevent unintentional rotation of the wheel 9.

The above noted instrumentalities operate substantially as follows: The pilot rotates the wheel 9 in a clockwise direction looking at Figure 6, the shafts 13 and 15 turning simultaneously therewith, by reason of the chains 12 and 14 respectively. The direction of movement of the various cables and sheaves, in consequence of this movement of the wheel 9, is shown by the various arrows in Figure 6. The masts 1 are thus raised by reason of the pull exerted by the cable 27, the additional amount of cable necessitated by this movement being automatically paid out by the spring operated sheaves 11 and 25. When the masts 1 are in an upright position as shown in Figure 6 in dotted lines, cables 16 and 22, as set out in the previous paragraph, serve as guy wires therefor. In this connection, if desired, struts or brace means, fastened to the fuselage, could be mounted at the rear of the masts 1 to positively prevent the latter from assuming any position to the right of that shown in Figure 6 in dotted lines. In order to return the masts 1 to inoperative position as shown in full lines in Figure 6, it is necessary merely to rotate the wheel 9 in a counterclockwise direction, the slack in the cables 22 and 16 being, of course, taken up by the spring operated sheaves 11 and 25. These sheaves, together with the above noted means for holding the masts 1 in place when in an upright position, come into play when the masts 1 are in an inoperative position to hold the same against accidental dislocation.

A portion of the structure above set forth in connection with the showing of Figure 6, may take a modified form as shown in Figure 11. In this figure, the chain and sprocket means 14 and the shaft 15 with its attendant sheave and cables are replaced by a simpler construction. In accordance with this simpler construction, a roller 29 is mounted on the shaft 13. Additional rollers 30 and 31 are fixedly mounted on the fuselage B in spaced relation. A bracket 32, see also Figure 4, fixed to the fuselage, is disposed substantially intermediate the rollers 30 and 31. The ends of the bracket 32 support in fixed relation thereto a guide 33, about which a slide 34 is disposed. A cable 35 or the like is cooperatively associated with the rolles 29, 30, and 31, and is connected with the slide 34 at 34a so that the latter moves therewith. The slide 34 is provided with a boss or other upstanding portion 36, to which is pivotally conected a link 37, the opposite end of the link 37 being pivoted at 38 to the masts 1. It will be evident that upon movement of the chain 12 as shown by the arrows in Figure 11, said chain being operated in the same manner as shown in Figure 6, the cable 35 will be caused to exert a pull on the slide 34, moving the latter to the right, thereby forcing the link 37 and the masts 1 to the right, until the masts 1 assume an upright position as shown in dotted lines in Figure 11. It is apparent that with this construction no slack take up means for the cable 35 is necessary, although, as heretofore described in connection with the construction of Figure 6, such means is employed in connection with the cable 16. Reverse movement of the chain 12 will, of course, result in the lowering of the masts 1 to their position of repose as illustrated in full lines in Figure 11. Means substantially as set forth above in connection with the construction illustrated in Figure 6 may be suitably employed in connection with this modification of Figure 11 for bracing the masts 1 against the wind. As an additional feature in this connection, it should be noted that the ends of the guide supporting brackets 32 serve as stops to limit the movement of the slide 34, the right hand stop cooperating with the link 37 to prevent movement of the masts to the right beyond the position shown in dotted lines in Figure 11.

In the form of my invention in which masts are employed, novel instrumentalities are provided for pulling the rip cord to release the parachute. To this end the framework of the fuselage B is provided with a pair of trunnions 39 provided with fixed collars 40 intermediate their ends, said ends receiving for pivotal movement thereon a member 41. The member 41 is rigidly secured for movement with a guide 42 in which is longitudinally movable a slide member 43. The guide 42 is provided at its upper end with a fixed collar or flange 44 to which is secured at 45 a rip cord or parachute release 46, the opposite end of which is conventionally or otherwise suitably fastened to a parachute, adapted to be supported by the masts 1. The slide 43 is provided with a head 47 to which spring members 48 are secured at 49. The opposite ends of the springs 48 are secured to the member 41 at 50. The head 47 is provided with an upwardly extending female portion 51. The framework of the fuselage B is provided with a cross bar 52 upon which a T-shaped member 53 is pivotally mounted. The stem of the T-shaped member 53, indicated at 54, fits into the portion 51, and has an opening registering with an opening in the portion 51, a cotter pin 55 normally passing through said openings and holding the stem 54 and the portion 51 against separation. With the parts shown in full lines in Figures 3 and 4, the springs 48 are in an extended condition and consequently exert a force on the slide 43 tending to move the heads 44 and 47. The guide 42 being limited to pivotal movement about the trunnion 39, it is evident that the slide 43 must move, if at all, downwardly through the guide 42. A cord or the like 56, in easy reach of the pilot, is connected to the cotter pin at 57. The spring members 58, suitably connected to the framework, are connected to opposite sides of the guides 42 as shown in Figure 3, and serve to resiliently support the latter against pivotal movement about the trunnion 39.

The novel means just described operates as follows: The pilot pulls the cord or the like 56, withdrawing the cotter pin 57, whereupon the springs 48 cause downward movement of the slide 43, until the bottom of the latter occupies a position substantially as shown in dotted lines at 43a in Figure 3. The cord 56 will preferably be pulled shortly before the airplane reaches the ground. At about the time the landing takes place, the bottom of the slide 43 at 43a will be engaged by the ground and shifted against the action of the springs 58 to the position shown in dotted lines at 43b. This shifting movement is possible by reason of the pivotal mounting of the guide 42 upon the trunnions 39. It is evident that in consequence of this shifting movement, the rip cord 46, by reason of its attachment at 45 to the guide 42, will be pulled sufficiently to open the parachute, which will be distended by the rush of air as the airplane continues forward. The resultant braking effect of the parachute is obvious.

In the form of my invention shown in Figures 9 and 10, a standard 59 is mounted at the rear of the fuselage and supports a parachute pack 60 having a stream-lined false front 61. The pack is provided with the usual elastic straps 62, which, when released by the rip cord 63, permit the parachute to be opened by the rush of air as the airplane moves forward. The rip cord 63 may be operated directly by the pilot, or instrumentalities such as shown in Figure 3 may be employed for this purpose. Guy wires 64 connected to the front 61 and the stabilizer 5 on the airplane may be employed to further support the parachute pack 60.

While in the case of an airplane such as illustrated in Figures 1 and 2, a single parachute may be sufficient to accomplish the desired results, it may be advantageous, in the case of a heavier airplane such as illustrated in Figure 8, to employ a plurality of parachutes. The parachutes may be connected to the wing 65 at points 66, and springs or equivalent means may be employed in conjunction with the parachute for opening the same in cooperation with the rush of wind. Means may be provided within easy reach of the pilot for releasing the springs at the desired time.

While the hazards attendant in flying a landplane, insofar as forced landings are concerned, are perhaps more numerous than in the case of a seaplane, it is nevertheless possible that under certain conditions the stopping of a seaplane in a relatively short space might be highly desirable. I, therefore, wish it understood that while I have illustrated my invention applied to a landplane, it is equally applicable to a seaplane.

The fuselage is preferably provided with a depression 8 adapted to receive the parachute pack when the masts lie alongside the fuselage, in order to avoid wind resistance by the pack.

It will be evident that, in the case of a forced landing, the landing speed will be quite high so that the wind pressure will be sufficient to operate the parachute without delay.

The bottom of the slide 43 will, by reason of its engagement with the ground, have a braking effect to some extent, and will also serve as the equivalent of a tail skid.

It should be understood that while the invention is disclosed as applied to airplanes, it is to be borne in mind that it is capable of use in other fields, wherever a braking or retarding effect is desired.

It will be appreciated that the tail skid itself could be modified to automatically operate the release.

The invention has been described herein more or less precisely as to details, yet it is to be understood that the invention is not to be limited thereby, as changes may be made in arrangement and proportion of parts and equivalents may be substituted without departing from the spirit and scope of the invention.

I claim as my invention:

1. An airplane, a mast carried by the tail structure of the airplane, a parachute carried by the mast, a connection between a wing of said airplane and said mast, whereby stresses incident to operation of the parachute will be carried by said wing, said mast being pivoted to the tail structure, and means for raising and lowering the mast.

2. An airplane, a parachute carried thereby, and means for releasing the parachute to permit the same to open, said means comprising a plunger slidably and pivotally carried by the airplane, means yieldably urging said plunger downwardly, a manually releasable device for rendering said yieldable means effective to project said plunger into a position to engage the surface along which the airplane is moving, whereby, upon such engagement, the plunger will be tilted, and a connection from the plunger to the parachute and effective to release the parachute when the plunger is tilted.

3. An airplane having a fuselage provided with a recess, a mast pivoted thereto forwardly of the airplane rudder and normally lying along the fuselage, a parachute pack secured to the free end of the mast and normally disposed in said recess, means for raising the mast and means for releasing the pack when the mast is in raised position, said releasing means including a reciprocable and tiltable member engageable with the ground, means normally retaining said member in retracted position, spring means connected to said member to move the same downwardly into ground engaging position upon release of said retaining means, a rip cord connecting said member and said pack and actuated upon tilting of said member by engagement of the latter by the ground to release said pack for airplane braking purposes.

4. An airplane having a fuselage provided with a recess, a mast pivoted thereto forwardly of the airplane rudder and normally lying along the fuselage, a parachute pack secured to the free end of the mast and normally disposed in said recess, means for raising the mast and means for releasing the pack when the mast is in raised position, said releasing means including a reciprocable and tiltable member engageable with the ground, means normally retaining said member in retracted position, spring means connected to said member to move the same downwardly into ground engaging position upon release of said retaining means, a rip cord connecting said member and said pack and actuated upon tilting of said member by engagement of the latter by the ground to release said pack for airplane braking purposes, said parachute, when released, being located above and clear of said rudder to obviate interference of the parachute with the action of the rudder.

5. In a device for retarding movement of an airplane on the landing surface upon landing thereon, a parachute supported by the tail structure of the airplane when the parachute is collapsed, and a connection between the upper part of the forward portion of the airplane and the parachute, whereby stresses incident to operation of the parachute when open will be carried by said upper part, said parachute, when open, being clear of the air stream to the rudder in order not to interfere with the ability of the rudder to turn the airplane.

6. In an airplane construction of the class described, a parachute for retarding movement of the airplane along the landing surface upon landing of the airplane, and tension means operably connected to the parachute and extending substantially horizontally between the parachute and the upper part of a forward portion of the airplane and connected to said part at a greater elevation than the center of gravity of the airplane, whereby to resist the tendency of the airplane to nose over and to subject said part to strain incident to the operation of the parachute, said parachute, when open, being clear of the air stream to the rudder in order not to interfere with the ability of the rudder to turn the airplane.

7. A device for retarding movement of an airplane on the surface upon which it has landed, comprising a mast carried by the airplane, parachute means supported by the mast when the parachute means is folded, and a connection extending rearwardly from a wing of the airplane to said parachute means to transmit to said wing stresses due to air pressure on said parachute means as the airplane moves along the landing surface, said parachute means and connection being disposed clear of the air stream to the rudder for all positions of the rudder so as not to interfere with the ability of the rudder to turn the airplane during such movement.

8. A device for retarding movement of an airplane on the surface upon which it has landed, comprising a mast carried by the airplane, parachute means supported by the mast when the parachute means is folded, and a connection extending rearwardly from a wing of the airplane to said parachute means to transmit to said wing stresses due to air pressure on said parachute means as the airplane moves along the landing surface, said parachute means and connection being disposed clear of the air stream to the rudder for all positions of the rudder so as not to interfere with the ability of the rudder to turn the airplane during such movement, and means rendered operative by the landing of the airplane for enabling the rush of air to operate said parachute means upon such landing of the airplane.

9. A device for retarding movement of an airplane on the surface upon which it has landed, comprising a mast carried by the airplane, parachute means supported by the mast when the parachute means is folded, and a connection extending rearwardly from a wing of the airplane to said parachute means to transmit to said wing stresses due to air pressure on said parachute means as the airplane moves along the landing surface, said parachute means and connection being disposed clear of the air stream to the rudder for all positions of the rudder so as not to interfere with the ability of the rudder to turn the airplane during such movement, means for elevating and lowering said mast, and means rendered operative by the landing of the airplane for enabling the rush of air to operate said parachute means upon such landing of the airplane.

OVERTON M. BOUNDS.